US006455955B1

(12) United States Patent
Otsubo et al.

(10) Patent No.: US 6,455,955 B1
(45) Date of Patent: Sep. 24, 2002

(54) ELECTRO-SENSITIVE WORKING MEDIUM AND METHOD OF USING THE MEDIUM

(75) Inventors: Yasufumi Otsubo, Chiba; Shinichi Yokota, Sagamihara; Kazuya Edamura, Tokyo, all of (JP)

(73) Assignee: New Technology Management Co., Ltd., Tokyo (JP)

( * ) Notice: Subject to any disclaimer, the term of this patent is extended or adjusted under 35 U.S.C. 154(b) by 0 days.

(21) Appl. No.: 09/673,569

(22) PCT Filed: Feb. 15, 2000

(86) PCT No.: PCT/JP00/00801

§ 371 (c)(1), (2), (4) Date: Oct. 18, 2000

(87) PCT Pub. No.: WO00/49110

PCT Pub. Date: Aug. 24, 2000

(30) Foreign Application Priority Data

Feb. 19, 1999 (JP) .......................................... 11-041179
Feb. 24, 1999 (JP) .......................................... 11-046993

(51) Int. Cl.[7] .......................... G21D 7/02; H02K 44/00
(52) U.S. Cl. .......................... 310/11; 335/228; 252/580
(58) Field of Search ........................ 310/11; 335/47–58, 335/228; 252/570, 580, 581

(56) References Cited

U.S. PATENT DOCUMENTS 5,374,367 A * 12/1994 Edamura et al. .............. 252/79
5,705,969 A 1/1998 Edamura et al. ............ 335/228
6,030,544 A 2/2000 Yokota et al. ................ 252/79

FOREIGN PATENT DOCUMENTS

| | | |
|---|---|---|
| EP | A2588482 | 3/1994 |
| EP | A1787792 | 8/1997 |
| JP | 6-057274 A | 3/1994 |
| JP | 6-073390 A | 3/1994 |
| JP | 9-208977 A | 8/1997 |
| JP | 9-208978 A | 8/1997 |
| JP | 9-271188 A | 10/1997 |
| JP | 10-088174 A | 4/1998 |
| JP | 10-146075 A | 5/1998 |
| JP | A1129508 | 2/1999 |

OTHER PUBLICATIONS

Y. Otsubo et al., International Conference on ERM, MRS and Their Applications, Jul. 22–25, 1997, pp. 23–24—"Rheologicla Changes of Suspensions Induced by Electrohydrodynamic Instability".

* cited by examiner

*Primary Examiner*—Ramon M. Barrera

(57) ABSTRACT

The even system electricity induction operation medium of this invention has 3 halogen atoms, especially fluorine atom into a/the molecule at least it is the even system electricity induction operation medium including one kind of liquid state organic compound at least. A even system electricity induction operation medium about-the electric conduction rate under the operation environment temperature are the electricity induction operation medium that, is in the range of $4\times10^{-10}$~$5\times10^{-6}$S/m and the surface tension of the even system electricity induction operation medium under the operation environment temperature are 22 dyn/cm following. This even system electricity induction operation medium is difficult combustion or noninflammable nature. This even system electricity induction operation medium is difficult combustion or noninflammable. The movement style of the medium is formed among the electrode when a un-uniform electric field is formed to this electricity induction operation medium and can use this movement style to the device such as ECF motor, pump, washing device. The electricity induction operation medium of this invention is noninflammable almost because a particular halogen atom, especially fluorine compound are contained and there is not the risk of ignition even if the spark etc. results among the electrode. Also, the movement style of the electricity induction operation medium can be formed effectively because the electric conduction rate and also surface tension are in a particular range.

12 Claims, 9 Drawing Sheets

SE(stator-electrode) type ECF motor (A)

(B)

ELECTRO-SENSITIVE WORKING MEDIUM AND METHOD OF USING THE MEDIUM

This application is the national phase under 35 U.S.C. § 371 of PCT International Application No. PCT/JP 00/00801 which has an International filing date of Feb. 15, 2000, which designated the United States of America.

BACKGROUND OF THE INVENTION

1. Technological Field

This invention relates to the homogeneous electro-sensitive movable medium and also the method of using the medium that is difficultly flammable or non-flammable. Furthermore in details this invention is the homogeneous electro-sensitive movable medium (Electro-Conjugate Fluid=ECF) that forms the moving flow by applying a high DC voltage, moreover the homogeneous electro-sensitive movable medium that does not ignite even on spark etc. that happens to take place at the time the voltage is applied and can be used with efficiency and safety. It relates to a method of using this homogeneous electro-sensitive movable medium.

2. Prior Art

It is disclosed for example in JP-A 9-271188, JP-A 9-208978, JP-A 10-146075, JP-A 9-208977, JP-A 10-88174 etc. that, by applying voltage to a particular insulation liquid, a moving flow of the insulation liquid is formed in correspondence to the applied voltage (the ECF effect).

By the way, it is necessary to apply the high DC voltage of 1KV or above to the electro-sensitive movable medium in order to form the moving flow of such an electro-sensitive movable medium with stability. Motors using the moving flow of this electro-sensitive movable medium are miniaturized characteristically to have an increased energy density supplies and an increased transformation efficiency to transform electricity energy into exercise energy.

Such a miniaturized device will be, however, involved in sparks which happen easily when the voltage is applied because the distance between the electrodes of the device becomes shorter and even little bubbles exists in the device.

It is accordingly desirable to use such an electro-sensitive movable medium that neither degrades nor ignites by sparks that sometimes occur when the voltage is applied, in the case the electro-sensitive movable medium is used for long time.

In JP-A 6-57274 and JP-A 6-73390 is furthermore disclosed the invention relating to an electricity induction composite where a specified fluorine compound is dispersed in an insulating liquid such as silicone oil. The fluorine compounds disclosed in those patent publications is solid at a normal temperature and is insoluble or difficultly soluble in an insulating liquid such as silicone oil. The electricity induction composites disclosed in those patent publications are in a non-homogeneous system where the solid fluorine compound is dispersed finely in the insulating liquid. When a voltage is applied to the electricity induction composite of such a non-homogeneous system, for example, the finely dispersed fluorine compounds align in state of chains and cause the electricity induction composite to have a fluctuated fluid property. In the electricity induction composite of such a non-homogeneous system, the finely dispersed fluorine compound easily settles down and it is difficult to store the liquid stably for a long time. Then an insulating liquid such as silicone oil are involved in problems that, since it has a flash point, this base oil, such as silicone oil, sometimes ignites when sparks happen and degrades in itself with sparks in many occurrences.

DISCLOSURE OF THIS INVENTION

The co-inventors have found, advanced from the fundamental characteristic of the electro-sensitive movable medium that forms the moving flow by applying voltage, that the electro-sensitive movable medium is required to be stable, even with sparks that happen at the time of applying voltage, to drive a device using an electro-sensitive movable medium with an applied voltage with stability for long time, thus completing this invention.

This invention provides, for the purpose, an electro-sensitive movable medium to form the moving flow with DC voltage application and also the method of using it.

More in details, the purpose of this invention is to furnish the electro-sensitive movable medium, and the method of using it, that generates the moving flow with DC voltage application by way of electric energy caused by application of DC voltage, which flow may be used as mechanical energy, for example rotational energy.

And, the invention provides, for the purpose, the stable electro-sensitive movable medium, and the method of using it, that does not ignite even if a spark occurs on the high DC voltage application and can make the device operate stably for a long time.

This invention is a homogeneous electro-sensitive movable medium comprising at least one liquid organic compound having at least 3 halogen atoms in the molecule thereof, the medium having an electro conductivity in the range of $4\times10^{-10}$~$5\times10^{-6}$ S/m at the operation temperature of the medium and a surface tension of 22 dyn/cm or smaller at the operation temperature of the medium.

As for the halogen atom the fluorine atom is desirable. It is desirable to have no flash point substantially.

The method of using the electro-sensitive movable medium, according to the invention, is characterized by comprising arranging at least one pair of electrodes in the medium and applying an electric voltage of 100V~20KV between the pair of electrodes to make the medium move from one electrode toward the other electrode direction.

It is characterized by arranging the medium in a package equipped with at least one pair of electrodes, applying the electric voltage of 100V~20KV between the pair of electrodes to form the moving flow of the medium and rotate a rotor, equipped rotatably in the package by the formed flow (For example, it may be used as SE type ECF motor.)

It is characterized by filling a package with the medium, laying at least one pair of electrodes on a rotor equipped rotatably in the package, applying the electric voltage of 100V~20KV between the pair of electrodes to form the moving flow of the medium and rotate the rotor by a reaction of the moving flow (For example, it may be used as RE type ECF motor.)

It is characterized by filling a container equipped with at least one pair of electrodes with the medium, placing a washing object and applying the electric voltage of 100V~20KV between the pair of electrodes to form moving flow of the homogeneous electro-sensitive movable medium and bringing the washing object into contact with the moving flow of the homogeneous electro-sensitive movable medium to wash the washing object (For example, it may be used as a washing device.)

It is characterized by filling, with the medium, a container having a least one pair of electrodes and applying the electric voltage of 100V~20KV between the pair of electrodes to form the moving flow of the homogeneous electro-sensitive movable medium and move the homogeneous electro-sensitive movable medium to a target position (For example, it may be used as a pump). The moving flow can make it possible to transport heat energy of a high temperature-having part to a low temperature-having part or that of a low temperature-having part to a high temperature-having part. It is also possible to fill a closed circulation system with the medium and applying the electric voltage to the medium to form the moving flow thereof and circulate the medium in the closed circulation system and transport heat energy.

Furthermore this invention provides a power device comprising at least one pair of electrodes and a medium comprising at least one liquid organic compound having at least 3 halogen atoms in the molecule thereof, the medium having an electro conductivity in the range of $4\times10^{-10}$~$5\times10^{-6}$ S/m at the operation temperature of the medium and a surface tension of 22 dyn/cm or smaller at the operation temperature of the medium. This power device can be actuated by being engaged in a box.

It provides use of the above mentioned medium defined as a driving liquid, in particular to drive an actuator, a pump or a motor.

According to this invention, the moving flow of the above mentioned medium can be formed and used as driving power in various fields. It includes for example a cooling method comprising bringing the moving flow of the low temperature medium into contact with a high temperature-having part and then a heating method comprising bringing the moving flow of the high temperature medium into contact with a low temperature-having part.

In other words, this invention is a method of moving the above mentioned medium by voltage application. This moving liquid is utilized as a driving power. This power can rotate the rotor and also rotate the rotor in reaction by forming the medium's moving flow on the rotor wing. It is possible to wash or transport material by using the moving flow itself. The heat transfer is also possible using this.

It is desirable that the above mentioned homogeneous electro-sensitive movable medium is difficultly flammable or non-flammable, not having the flash point substantially.

The electro-sensitive movable medium of this invention contains the liquid organic compound having at least 3 halogen atoms, especially fluorine atoms, in the molecule and this electro-sensitive movable medium is difficultly flammable or non-flammable, not having the flash point substantially. About this homogeneous electro-sensitive movable medium the electro conductivity at the operation temperature is in the range of $4\times10^{-10}$~$5\times10^{-6}$ S/m, being an insulation liquid substantially. And, the surface tension of the homogeneous electro-sensitive movable medium at the operation temperature is 22 dyn/cm or smaller, which contains the liquid organic compound having at least 3 halogen atoms, especially fluorine atoms, in the molecule.

Then, the lower the surface tension is, the better moving flow the electro-sensitive movable medium can evidently form by a voltage application.

Thereupon, surface tensions of many kinds of liquids were measured. Many normal hydrocarbon compounds have much higher surface tensions than 22 dyn/cm.

In relation between properties for the electro-sensitive movable medium and the surface tension, when the voltage is applied to the liquid having a surface tension of 22 dyn/cm or smaller, the moving flow is formed very finely. In general, when a hydrogen atom(s) bonded to a carbon atom is replaced with a halogen atom in the molecule, the surface tension decreases. This effect is greater when the electro negativity of the halogen atom is larger and the greatest effect is obtained when the halogen atom is a fluorine atom.

Thus, the organic liquid which is replaced for at least 3 or more hydrogen atoms bonded to the carbon atoms with halogen atoms, especially fluorine atoms, has a low surface tension property. Also, when the liquid having a surface tension of 22 dyn/cm or smaller is the halogen containing compound, especially the fluorine containing compound, this compound is difficulty flammable or non-flammable, not having the flash point substantially. It has very excellent characteristics and properties for the electro-sensitive movable medium.

EASY EXPLANATION OF THE DRAWING

Figure 6:
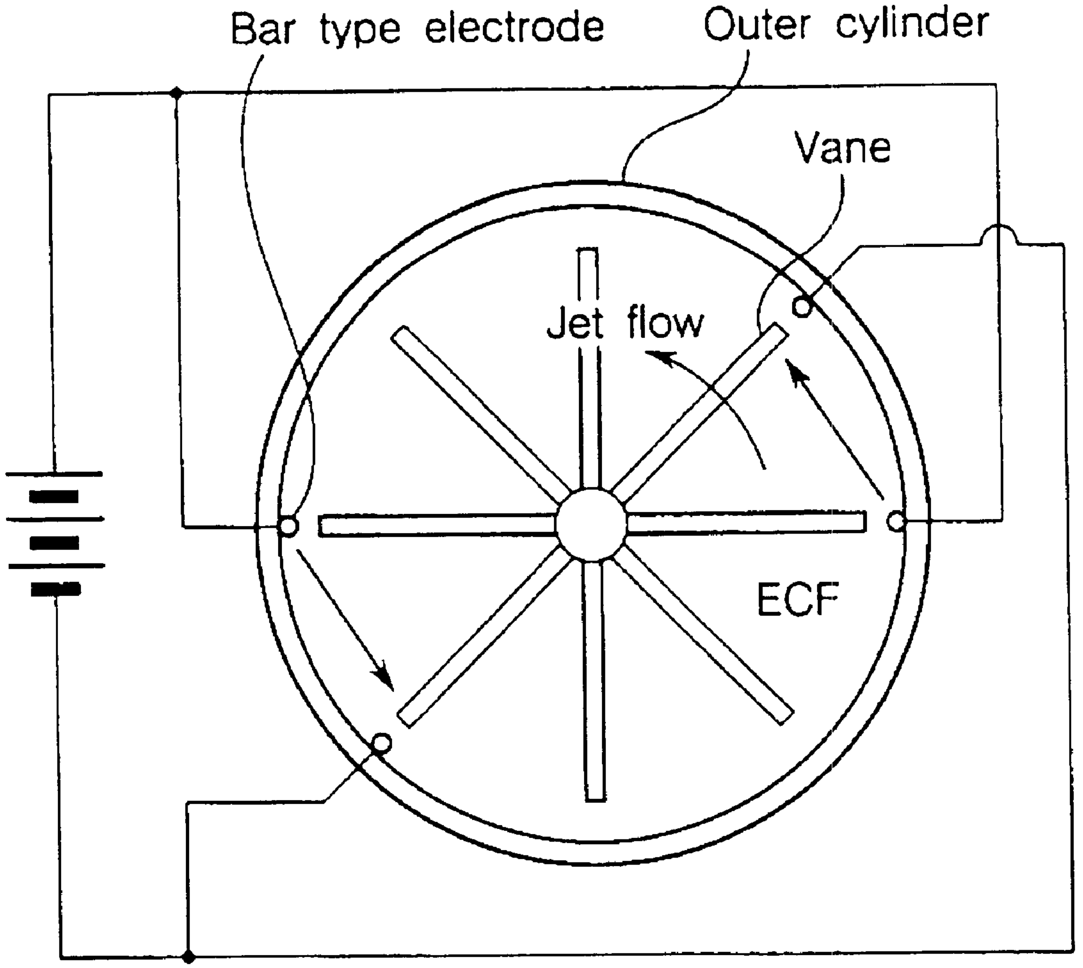

FIG. 6 watches the obliqueness that shows it and be the SE type ECF motor that used it with an enforcement example.

Figure 7:
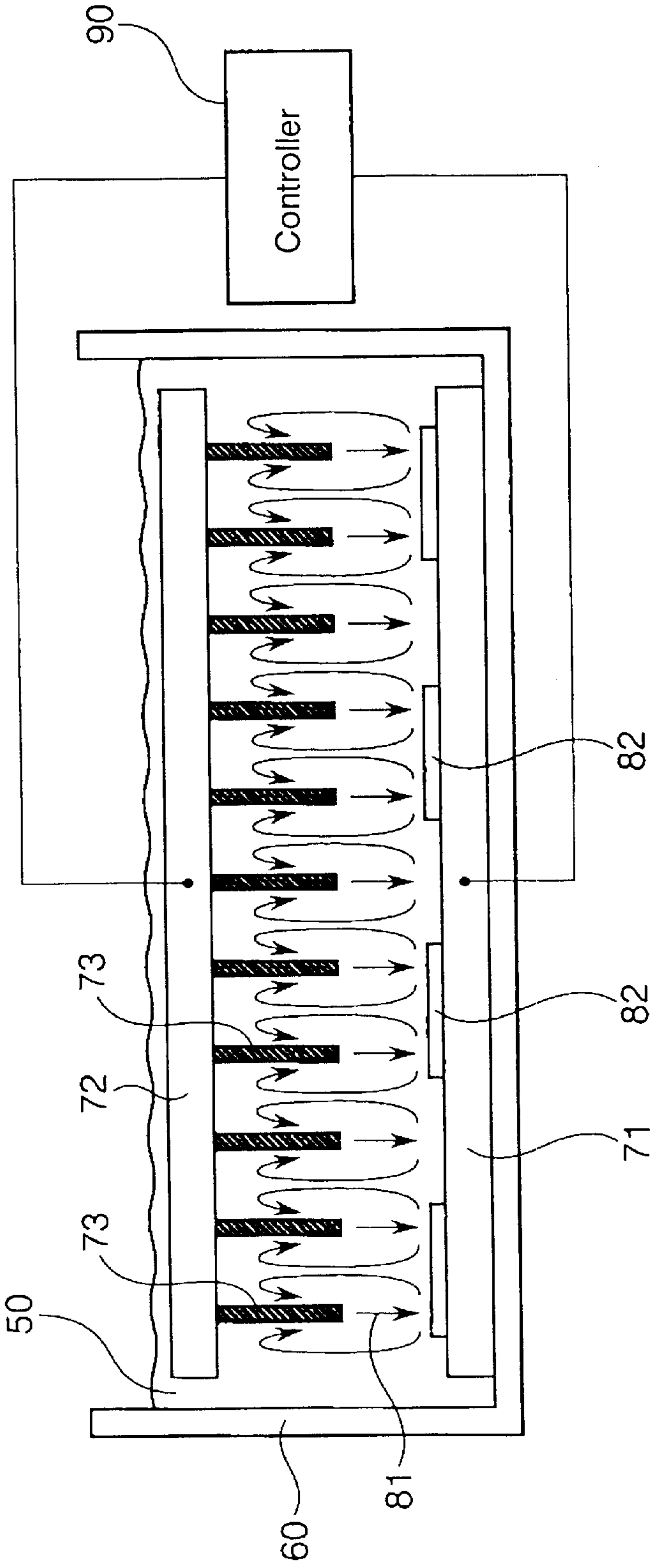

FIG. 7 is the side sectional plan of the SE type ECF motor that it used with the enforcement example.

Figure 8:
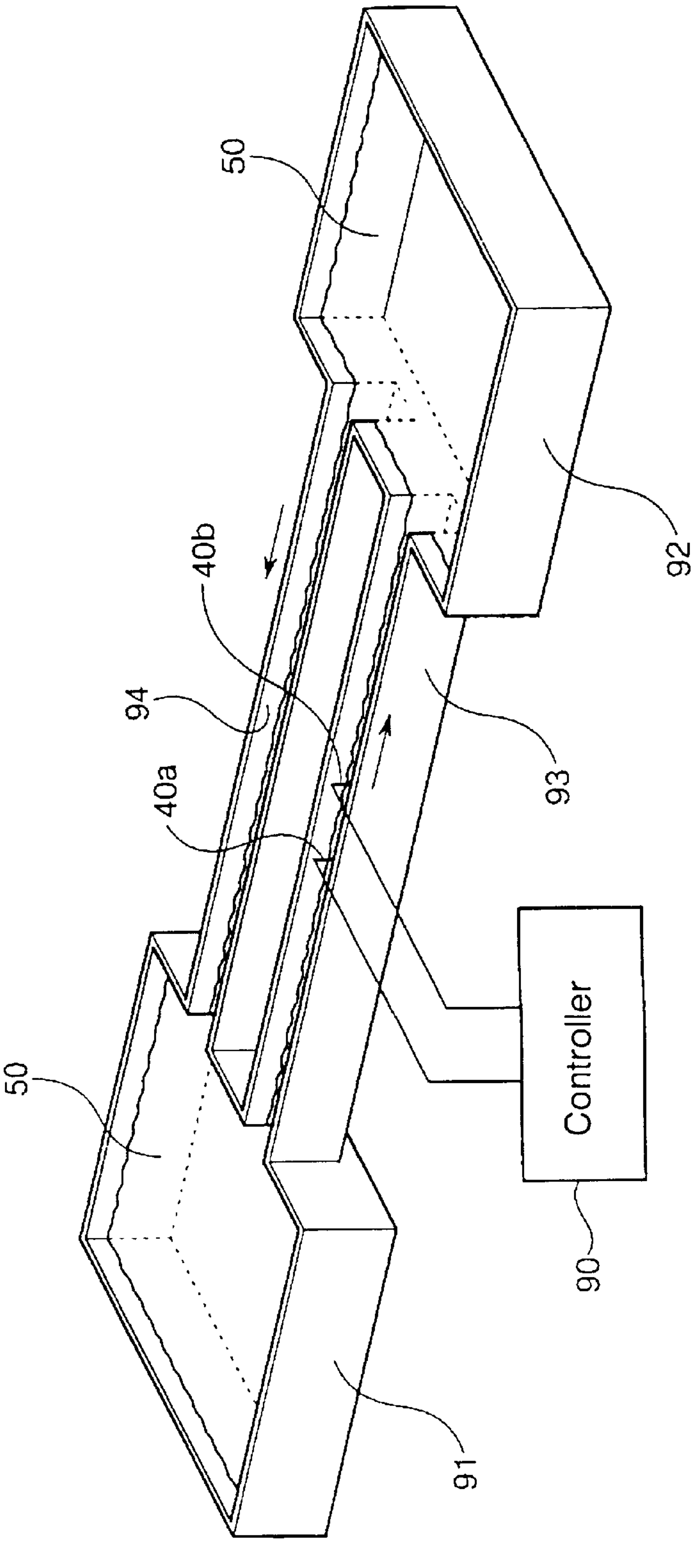

FIG. 8 shows the example of the pump that used the electro-sensitive movable medium of this invention like a trace.

Figure 9:
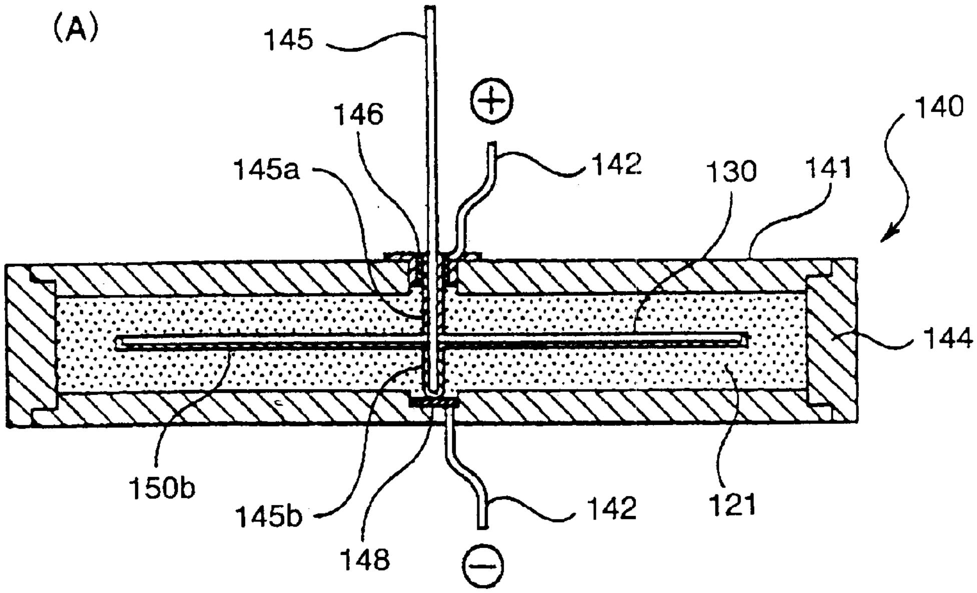
Figure 9:
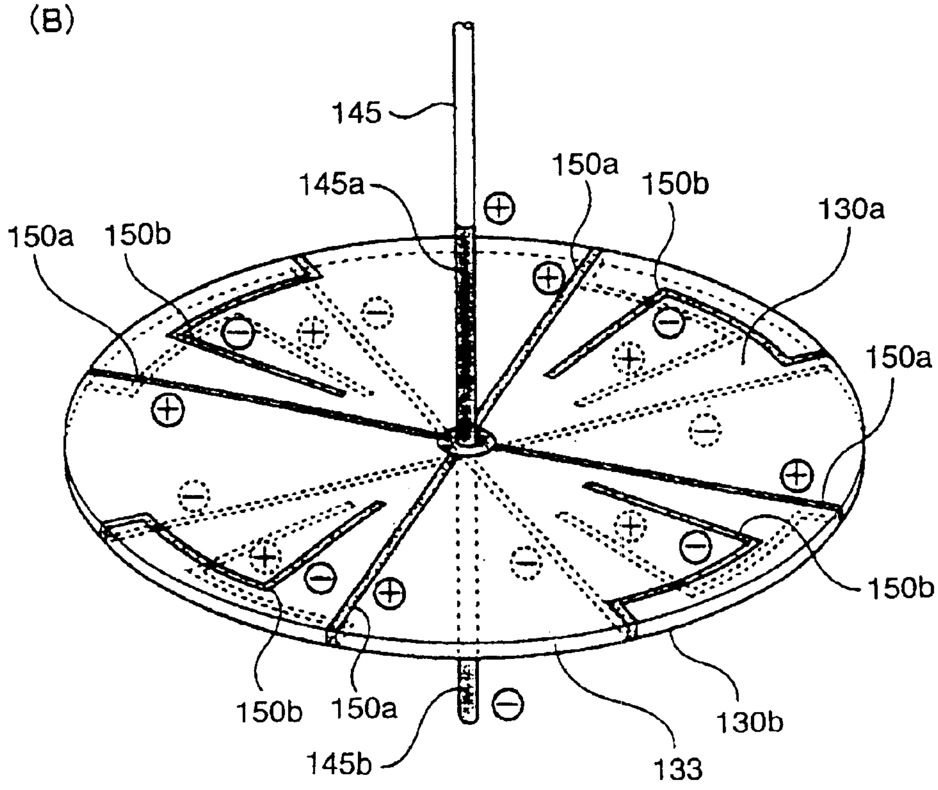

FIG. 9(A) is the length sectional plan of the RE type ECF motor of this invention and watches the obliqueness of a turn body and is FIG. 9(B).

Figure 10:
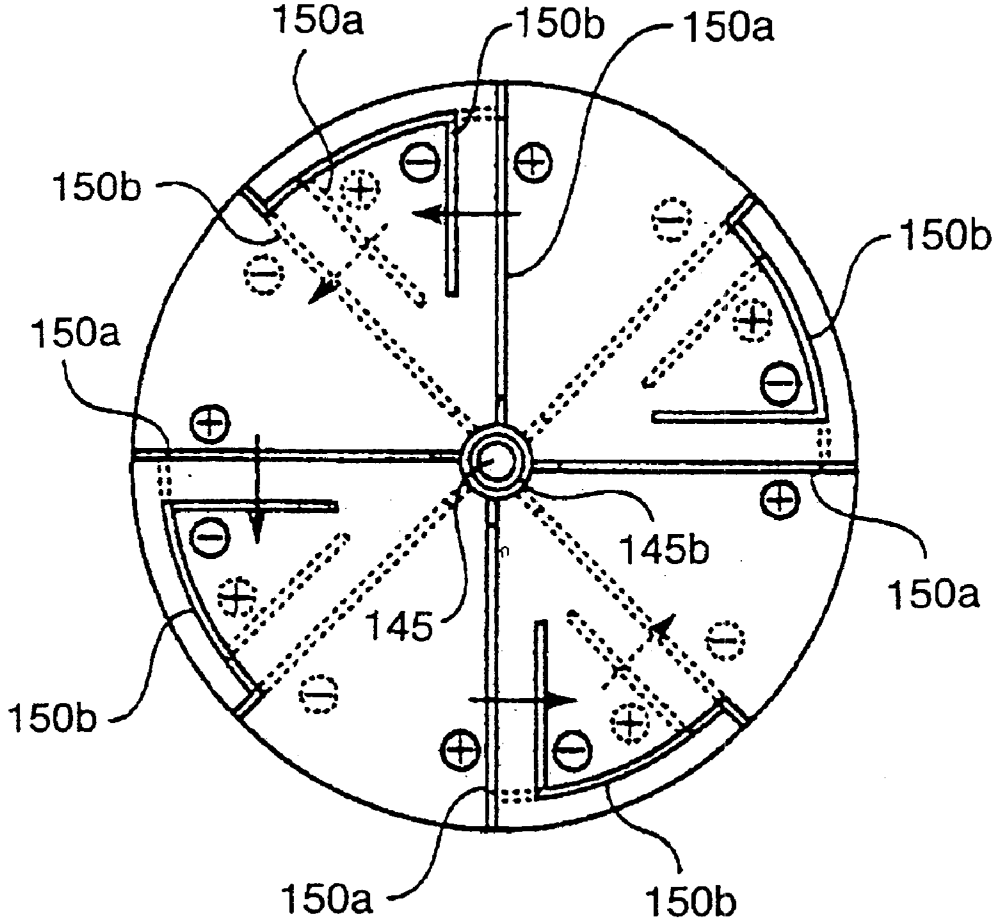

FIG. 10 is the figure that shows the example of the arrangement of the electrode in RE type ECF motor.

EXPLANATION OF THE MARKS

10—the packages
11—medium accommodation parts
12—upper part cover bodies
13—bottom material
14—concavo shape ball bearing parts
15—upper part ball bearing parts
16—bearing systems
20—the axis
30—rotor (the fin rotor, pipe state rotor)
40—the electrode
41—electrode insertion hole
42—electrode fixation hole
46—turn styles the point of contact
47—mercury
48—outside terminals
50—a homogeneous electro-sensitive movable medium
60—the container
71—the electrode
72—the electrode
73—the fiber

81—moving flow
82—washing objects
90—the controller
91,92—the container
93,94—the channel
130—turn bodies
150—the electrode

DETAILED EXPLANATION OF THE INVENTION

Next, I explain the electro-sensitive movable medium and also the method of using it which is difficulty flammable or nonflammable of this invention.

The electro-sensitive movable medium of this invention is a liquid which contains no particles, etc. substantially, and the liquid organic compound comprised in the electro-sensitive movable medium is an organic compound which has at least 3 halogen atoms, preferable 6–30 halogen atoms, especially fluorine atoms in the molecule. Also, the electro-sensitive movable medium of this invention is a liquid alone in the operation condition. The organic liquid as the electro-sensitive movable medium of this invention has at least 3, preferable at least 6 halogen atoms, especially fluorine atoms in the molecule. And, the composition contains usually 30–100%, preferable 35–100% of hydrogen atoms in the molecule which can be replaced with halogen atoms, especially fluorine atoms. By replacing the hydrogen atom with the halogen atom, especially the fluorine atom, the electro-sensitive movable medium of this invention becomes difficulty flammable or nonflammable. Furthermore, the compound of the structure that replaced all or a part of replaceable hydrogen atoms with the halogen atom, especially fluorine atom, becomes nonflammable. In addition, the surface tension of the organic compound that has at least 3 halogen atoms, especially fluorine atoms becomes small. Namely, the surface tension of the electro-sensitive movable medium of this invention should be 22 dyn/cm or smaller, preferable 10~20 dyn/cm. Also, this surface tension is the measurement value at the operation temperature that the electro-sensitive movable medium is used. Also, it of course can be measured by using a conventional surface tension measuring equipment in the market, although this surface tension is the value which was measured by a method described in JIS-3362. The surface tension of these compounds can be controllable to the some extent by the number of halogen atoms, especially fluorine atoms in the molecule (the proportion of a replaceable hydrogen atom by the halogen atom, especially the fluorine atom), and the compound as the electro-sensitive movable medium of this invention, which contains at least 3 halogen atoms, especially fluorine atoms, shows the smaller surface tension value than the corresponding compound which has no fluorine atoms.

By having the halogen atom, especially the fluorine atom like this, the electro-sensitive movable medium of this invention becomes difficulty flammable or nonflammable, not having the flash point substantially.

Furthermore, the stability of the compound having halogen atoms, especially fluorine atoms, is becoming high, besides it becomes difficulty flammable or nonflammable, and it disappears that this organic compound burns and decomposes by a spark etc.

The electro-sensitive movable medium of this invention is a substantially even insulating and the electro conductivity σ in a electric field strength 2KV/mm needs to be in the range of $4\times10^{-10}$~$5\times10^{-6}$ S/m, and furthermore preferable it is in the range of $5\times10^{-10}$~$2.5\times10^{-6}$ S/m. Also, this electro conductivity is the measurement value at the operation temperature of the electro-sensitive movable medium.

The electro-sensitive movable medium of this invention shows comparatively a small surface tension value in organic liquid compounds. However dibutyladipate mentioned later in the reference example can make SE type ECF motor operate rotationally, the surface tension is relatively high, namely 33 dyn/cm, and small bubbles sometimes appear in the operation when the motor is filled with it. Relatively high voltage is used for these ECF motor operations, and sparks sometimes appear to arrange an alignment of bubbles momentarily between electrodes which are mixed in the medium, large electric current flows momentarily between electrodes due to sparks to give a bad damage to electric power supply and the control instrument, and it leads to the failure and the unstable operation ability. Also, the deterioration of the medium occurs due to sparks, and it is very dangerous that the medium ignites and burns due to sparks when the medium is combustible. As a result of the experiment, the spark occurrence frequency by the bubble occurrence in the operation is few when the surface tension of the medium is 22 dyn/cm or smaller, and it is frequent in the medium of 30 dyn/cm or over. The bubbles occurred in the high surface tension medium would be stable, when the bubbles is considered to come from a contact surface between the medium and case and an air derived from the operation.

Above explanation is based on the idea that the high surface tension of the medium is stabilized the bubbles occurred in the operation in the medium, and this would be a reason of the frequent bubble occurrences and the frequent spark occurrences, and these are reasonable ideas only to help the comprehension of this invention, and of course the comprehension of this invention should not be restricted by these ideas.

As mentioned above, the electro-sensitive movable medium of this invention may comprise the liquid organic single compound, having at least 3 halogen atoms, especially fluorine atoms, or the homogeneous mixture of several compounds. In the case that the electro-sensitive movable medium of this invention is a mixture, above mentioned surface tension and electro conductivity are the surface tension and the electro conductivity of the mixture itself., and the whole mixture needs difficultly flammable or nonflammable, not having the flash point substantially.

By using the electro-sensitive movable medium of this invention, a device miniaturizes and the distance between the electrodes becomes small and the electro-sensitive movable medium does not ignite even due to sparks derived from a small portion of air, and hardly deteriorates due to the sparks.

Also, the electro-sensitive movable medium of this invention is the homogeneous liquid organic compound mentioned in above, and there is no dissolving material dispersed or suspended in the electro-sensitive movable medium, and a precipitation or a separation does not occur in it to be stable in a long term. The liquid halogenated organic compounds comprised the electro-sensitive movable medium, which has such these properties, especially the liquid fluorinated organic compounds are in following examples.

(1) Ethyl-perfluorobutyl-ether ($C_4F_{9—O—C2}H_5$)

[Electro conductivity $=1.0\times10^{-9}$ S/m, surface tension=14 dyn/cm]

(2) Ethyl-perfluoroisobutyl-ether (iso-$C_4F_9$—O—$C_2H_5$)

[Electro conductivity $=1.0\times10^{-9}$ S/m, surface tension=14 dyn/cm]

(3) Methyl-perfluorobutyl-ether ($C_4F_9$—O—$CH_3$)

[Electro conductivity $=1.1\times10^{-9}$ S/m, surface tension=14 dyn/cm]

(4) Methyl-perfluoroisobutyl-ether ($C_4F_{9—O—C2}H_5$)

[Electro conductivity $=1.1\times10^{-9}$ S/m, surface tension=14 dyn/cm]

(5) $C_9F_{18}$ (It is a trimer of $CF_3$—CF=$CF_2$ and the mixture of the following compound)

$(CF_3)_2$CFCF═C($CF_3$)CF$(CF_3)_2$—52% weight $(CF_3)_2$CFCF$_2$—C($CF_3$)=C$(CF_3)_2$—48% weight

[Electro conductivity$=3.5\times10^{-9}$ S/m, surface tension=16 dyn/cm]

(6) $C_6F_{12}$ (It is a dimmer of $CF_3$—CF═$CF_2$ and the mixture of the following compound)

$(CF_3)_2$CFCF═CFCF$_3$—93% weight $(CF_3)_2$C═CFCF$_2$CF$_3$—7% weight

[Electro conductivity$=6.0\times10^{-10}$ S/m, surface tension=13 dyn/cm]

(7) Benzotrifluoride ($CF_3$—$C_{6H5}$)

[Electro conductivity$=5.0\times10^{-8}$ S/m, surface tension=21 dyn/cm]

(8) p-Chlorobenzotrifluoride (p-Cl—$C_6H_4$—$CF_3$)

[Electro conductivity$=2.0\times10^{-}$S/m, surface tension=19 dyn/cm]

(9) Perfluorinated thermomedium; a product name: GALDEN HT-200, Ausimont K.K. production

[Electro conductivity$=5.2\times10^{-10}$ S/m, surface tension=12 dyn/cm]

(10) Mixture of 50% weight of ethyl-perfluorobutyl-ether and 50% weight of perfluorinated inert liquid

[Electro conductivity$=7.8\times10^{-10}$ S/m, surface tension=14 dyn/cm, (25° C.)]

Ethyl-perfluorobutyl-ether ($C_4F_9$—O—$C_2H_5$)

[Electro conductivity$=1.0\times10^{-9}$ S/m, surface tension=14 dyn/cm, (25° C.)]

Perfluorinated inert liquid (a product name: Fluorinert FC-43, Sumitomo 3M Co. Inc. production)

Electro conductivity$=7.0=10^{-13}$ S/m, surface tension=12 dyn/cm, (25° C.)]

(11) Perfluorinated inert liquid (the product name: Fluorinert FC-43, Sumitomo 3M Co. Inc. production) (80° C.)

Electro conductivity$=4.2\times10^{-10}$ S/m, surface tension=10.5 dyn/cm, (80° C.)]

These halogenated organic compounds, especially fluorinated organic compounds, are all liquid state at the operation temperature.

The electro-sensitive movable medium of this invention can be as a single liquid halogenated organic compounds, especially a single liquid fluorinated organic compounds, which surface tension and electro conductivity are in the range mentioned in this invention, and it also can be as a mixture of more than 2 kinds of halogenated organic compounds, especially fluorinated organic compounds, while the surface tension and the electro conductivity of the mixture are adjusted in the range mentioned in this invention. Also, these fluorinated compounds show a splendid mutual compatibility, and the homogeneous mixture of more than 2 kinds of these fluorinated organic compounds can occur the moving flow. Or, the moving flow can be available, even if the mixture shows a phase separation when the each component of the mixture is electro-sensitive.

Furthermore, the above mentioned fluorinated compounds do not show the flash point, even if it is measured with a regular flash point measurement method like as JIS-3362.

Accordingly, such a halogenated organic compound, especially fluorinated organic compound, is difficultly flammable at least, and most of the compounds or the mixture is nonflammable and does not burn. Also, these halogenated organic compounds, especially fluorinated organic compounds, or these mixtures are very chemically-stable, and show almost no deterioration even if there is a sudden environmental condition change like as a spark or etc. Furthermore, it is preferable that the viscosity of this electro-sensitive movable medium of this invention is low, to obtain an efficient moving flow of it when an electric voltage is applied to it, and usually the viscosity $\eta$ at the operation temperature is lower than $1\times10^{0}$ Pa·s, and furthermore the viscosity $\eta$ is preferable in the range of $1\times10^{-4}$ Pa·s~$1\times10^{0}$ Pa·s, and most preferable in the range of $2\times10^{-4}$ Pa·s~$8\times10^{-1}$ Pa·s.

Furthermore, the homogeneous electro-sensitive movable medium of this invention comprises above mentioned fluorinated organic compounds in principle, and it can contain other components while the essential characteristics of the homogeneous electro-sensitive movable medium of this invention can keep. Examples of the component, which can be contained in the homogeneous electro-sensitive movable medium of this invention, are a viscosity adjuster reagents, coloring materials, stabilizers, compatible materials, electro-sensitive movable improvers and etc., and the components can be indicated as which do not damage the essential characteristics of the electro-sensitive movable medium of this invention.

There are organic alcohol compounds and the like and organic amine compounds and the like, as an electro-sensitive movable improver. These are soluble in the electro-sensitive movable medium, and the electro conductivity and the surface tension of it after the soluble addition are in the range of claims mentioned in this invention.

Also, there is an explanation that these electro-sensitive movable improvers in the electro-sensitive movable medium of this invention are worked as an ionic nuclides or ionic seeds under a operation voltage application to improve the electro-sensitive movable characteristics, and the explanation is just an idea, which is derived from experimental facts confirmed by inventors, to help the comprehension of this invention, and of course the comprehension of this invention should not be restricted by these ideas.

Thus, the moving flow of the electro-sensitive movable medium forms to apply an electro voltage to at least 1 pair of electrodes arranged in the electro-sensitive movable medium. For reasons, using the electro-sensitive movable medium, the electric energy can be transformed into a kinetic energy such as the moving flow of the electro-sensitive movable medium. Furthermore, the electric energy can be used as a rotational energy to rotate the rotor derived from the moving flow of the electro-sensitive movable medium. Following is an explanation of motor using the homogeneous electro-sensitive movable medium of this invention. Arranging the electrodes to the motor package using the homogeneous electro-sensitive movable medium of this invention, the moving flow of the electro-sensitive movable medium forms to apply an electric voltage to the electrodes, and there are SE type ECF motor (Stator-electrode type electro-conjugate fluid motor), in which the moving flow collides with fins of the fin rotor to rotate the fin rotor, RE type ECF motor (Rotor-electrode type electro-conjugate fluid motor), in which the reaction of the moving flow makes the rotor rotate derived from an application of a electric voltage to electrodes installed on the rotor, and combined type motor.

Figure 1:
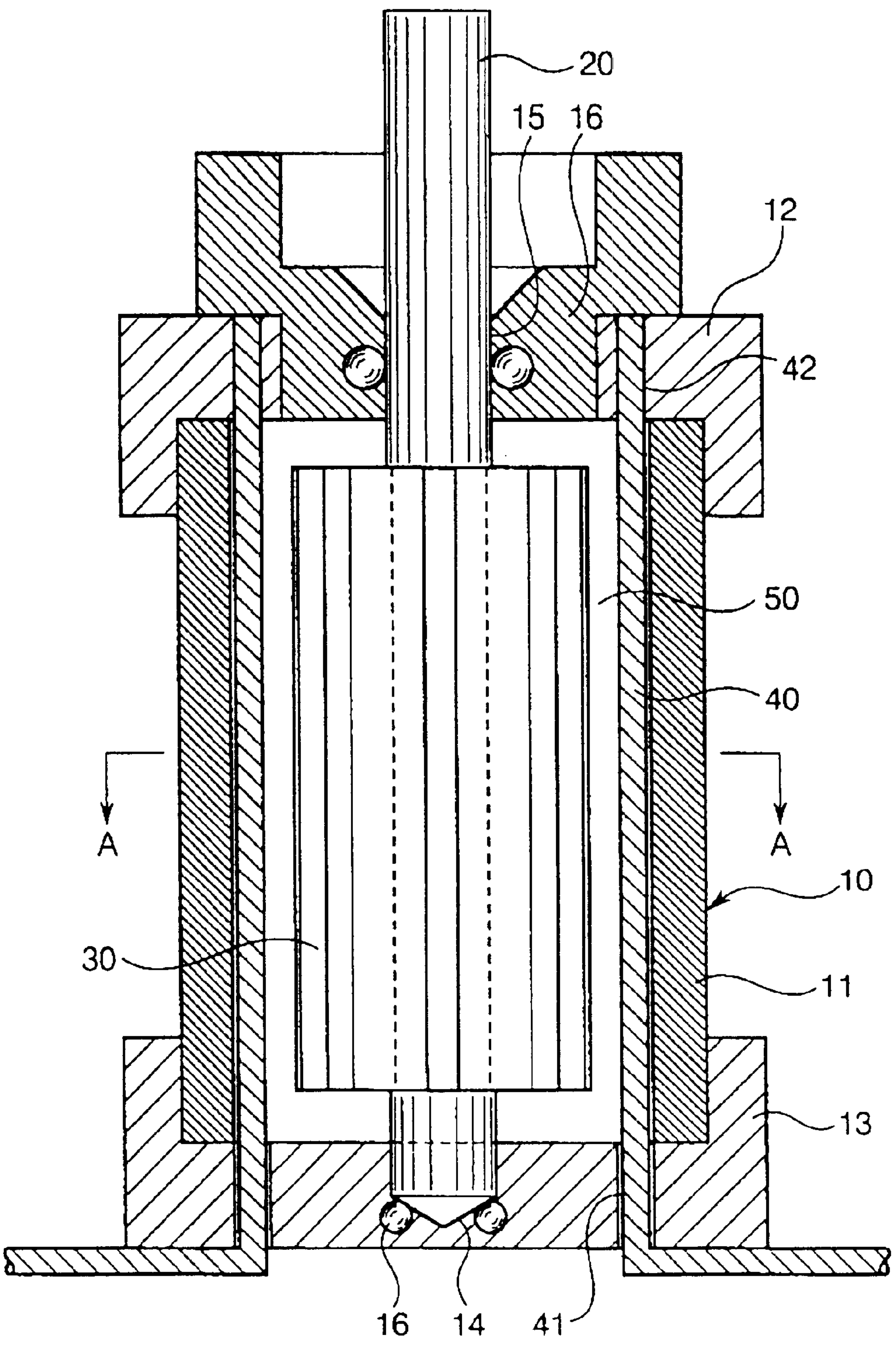
FIG. 1 shows the example of the SE type ECF motor that used the electro-sensitive movable medium of this invention.
Figure 2:
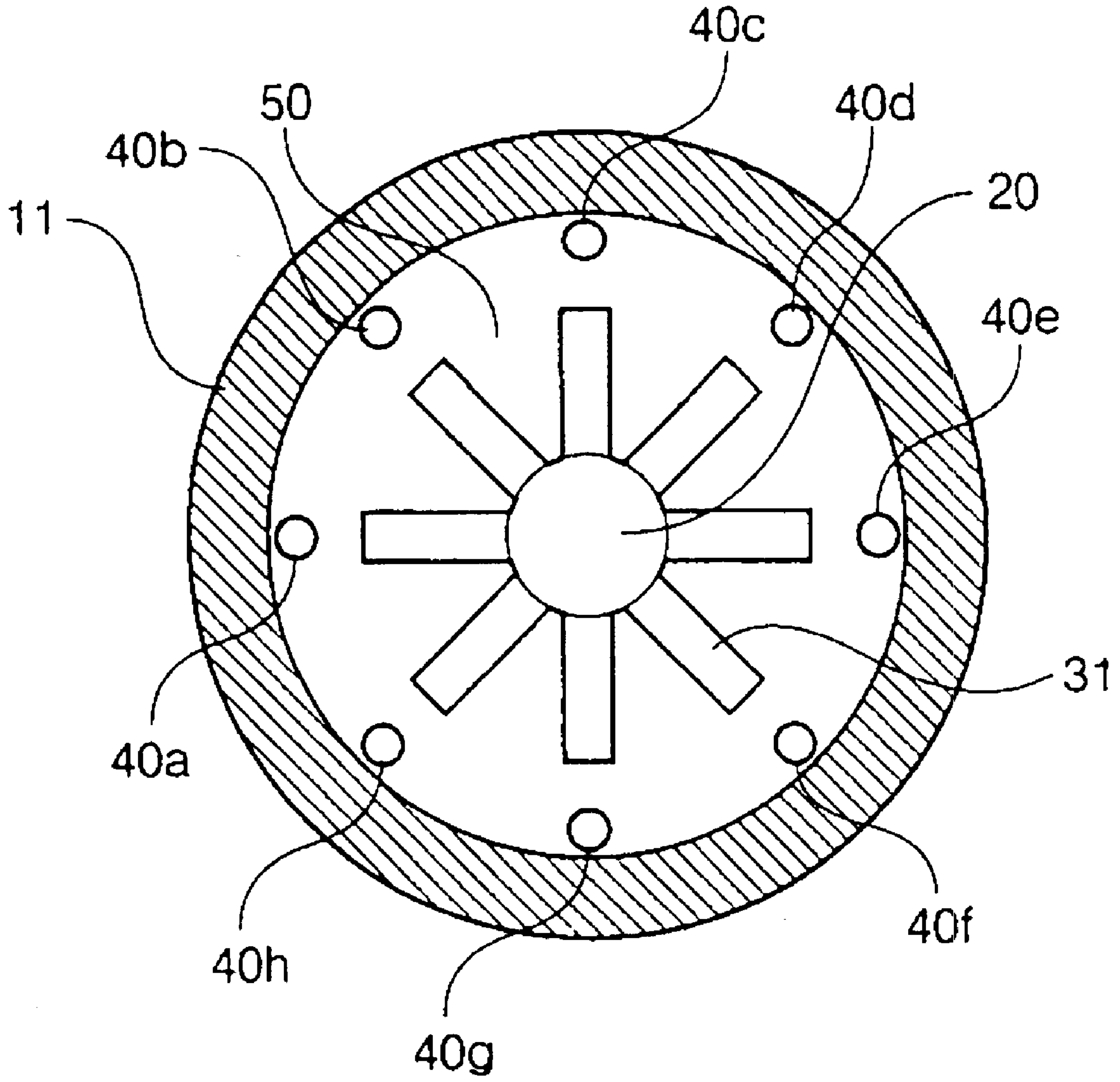
FIG. 2 is the side sectional plan of the SE type ECF motor that used the electro-sensitive movable medium of this invention.

This SE type ECF motor contains, as mentioned on FIG.-1 and FIG.-2, the package 10, the rotor 30 with rotational axis 20 in this package, and at least 1 pair of electrodes 40, installed on inside wall of the package 10, to apply an electric voltage to the homogeneous electro-sensitive movable medium 50. And, the homogeneous electro-sensitive movable medium 55 is filled up into the package 10.

The upper opening parts of this medium accommodation parts 11 where accommodates the homogeneous electro-sensitive movable medium 50 the package 10 is having such upper part cover body 12 that blocks bottom exist cylinder form medium accommodation parts 11. Medium accommodation parts 11 is supported to bottom material 13 forms cylinder parts material 12 and bottom that form the side partition. Concavo shape ball bearing parts 14 that does the bottom edge parts of axis 20 to the time movement free to, the central part of bottom material 13 axis fixed is formed. It is desirable that bearing system 16 is established as the friction with axis 20 is reduced in, these concavo shape ball bearing parts 14. Also, it is established as upper part cover bodies 12 blocks the opening parts of the upper part of medium accommodation parts 11. Upper part ball bearing parts 15 that does the upper part of axis 20 to the turn free to, the central part of this upper part cover body 12 fixed axis is formed. It is desirable that bearing system 16 is established in, this upper part ball bearing parts 15 after all.

Rotor 30 is arranged into this package 10. As this rotor 30 turns to package 10 by axis 20 it is arranged. Rotor 30 turns by the movement style that happens in the homogeneous electro-sensitive movable medium 50 that is filled up into the package 10.

Regarding this invention, the material for the parts, in contact with the homogeneous electro-sensitive movable medium (preferable fluorinated organic compounds), can be the synthetic resins (example: polyethylene and polypropylene beside polyolefines, Teflon, polycarbonates, acrylic resins, engineering plastics, etc.), which are not eroded by this homogeneous electro-sensitive movable medium (namely, halogenated organic compounds or fluorinated organic compounds), ceramics, lumbers, metals, glasses and etc. Also, electro conductive materials like as metals such as stainless steel can be used for the parts, and the insulation between electrodes should not be damaged in this case. Furthermore, the material that forms the device that is used is formed with the material that is common and be not eroded by the above homogeneous electro-sensitive movable medium used in this invention.

Axis 20, the electro-sensitive movable medium osculating plane of the inside circumference wall or rotor 30 of package 10 to and electrode 40 is almost arranged the plural in parallel. This plural electrode 40 is consisting of a positive electrode and negative electrode. This the polarity of the electrode that was arranged can set up variously, for example can arrange it so that a positive electrode and negative electrode are located alternately. This electrode 40 is passing the leading wire and the package 10 outside to supply electricity from the outside of micro motor.

In this SE type ECF motor, a preferable installed bearing system 16 can be either a needle bearing system, a rotor bearing system, a ball bearing system and a sleeve bearing system. When there are more than 2 bearing systems 16 in it, each system can be either same or different. Perceiving with fin 31 the movement of the operation medium of the time that the electro-sensitive movable medium 50 inside upper part cover body 12 and, this medium accommodation parts 11 of bottom exist cylinder form medium accommodation parts 11 and, this medium accommodation parts 11 that the SE type ECF motor that shows it like the trace in FIGS. 1 and also 2 fills up the homogeneous electro-sensitive movable medium 50 move by add of voltage it is having fin rotor 30 that turns. Such electrode insertion hole 41 that arranges electrode 40*a*~40*h* in, bottom material 13 of bottom exist cylinder form medium accommodation parts 11 here is formed. Also, such electrode fixation hole 42 that fixes electrode 40*a*~40*h*.that was inserted in, this upper part cover body 12 from electrode insertion hole 41 in the inside circumference wall of package 10 is formed.

Upper part ball bearing parts 15 that axis 20 of wing rotor 30 is done to the central part of upper part cover body 12 is formed.

The fin rotor 30 is having plural fin board 31 that was arranged in the radiation state from axis 20 and be stopped this fin rotor 30 the axis to the time movement free to package 10 by axis 20 that was stopped to the turn free the axis by concavo shape ball bearing 14 and upper part ball bearing parts 15 that were established at the center of bottom material 13 inside medium accommodation parts 11. This fin board 31 can make the structure or ratchet form etc. various structures that were curved toward such structure, for example, flow that are able to use the movement of the electro-sensitive movable medium efficiently, although the ordinariness is a board state. Also, making this rotor the flat disk state reach the surface (and/or to the back) the resistant that receives the moving flow of the homogeneous electro-sensitive movable medium it can make the SE type ECF motor of this invention flat, by forming.

Electrode 40*a*~40*h* is expanded upward along the inside wall of medium accommodation parts 11 so as not to be introduced inside medium accommodation parts 11 from electrode insertion hole 41 and prevent the turn of fin rotor 30 and the top is inserted in electrode fixation hole 42 and be fixed. Also, this electrode 40*a*~40*h* can also form to the wall of medium accommodation parts 11 by utilizing plating technology. It is sufficient to do voltage to an optional electrode add so that does not necessarily need to do voltage to all the electrodes add and the moving flow of the homogeneous electro-sensitive movable medium 50 be easy to form, although it does voltage to such an electrode 40*a*~40*h* add. Accordingly, to form the moving flow of the homogeneous electro-sensitive movable medium 50 in electrode 40*a*~40*h* as for a necessary electrode, is sufficient to there is 1 pair at least and other electrodes may be a dummy electrode without being done voltage add.

The homogeneous electro-sensitive movable medium 50 is made in this invention, only be filled up, as the air does not remain in the above medium accommodation parts 11.

After I filled up this way homogeneous electro-sensitive movable medium 50 it does voltage to the electrode add and the moving flow of the medium is formed, by forming a un-uniform electric field in the homogeneous electro-sensitive movable medium 50 and the rotor turns following this moving flow.

Figure 3:
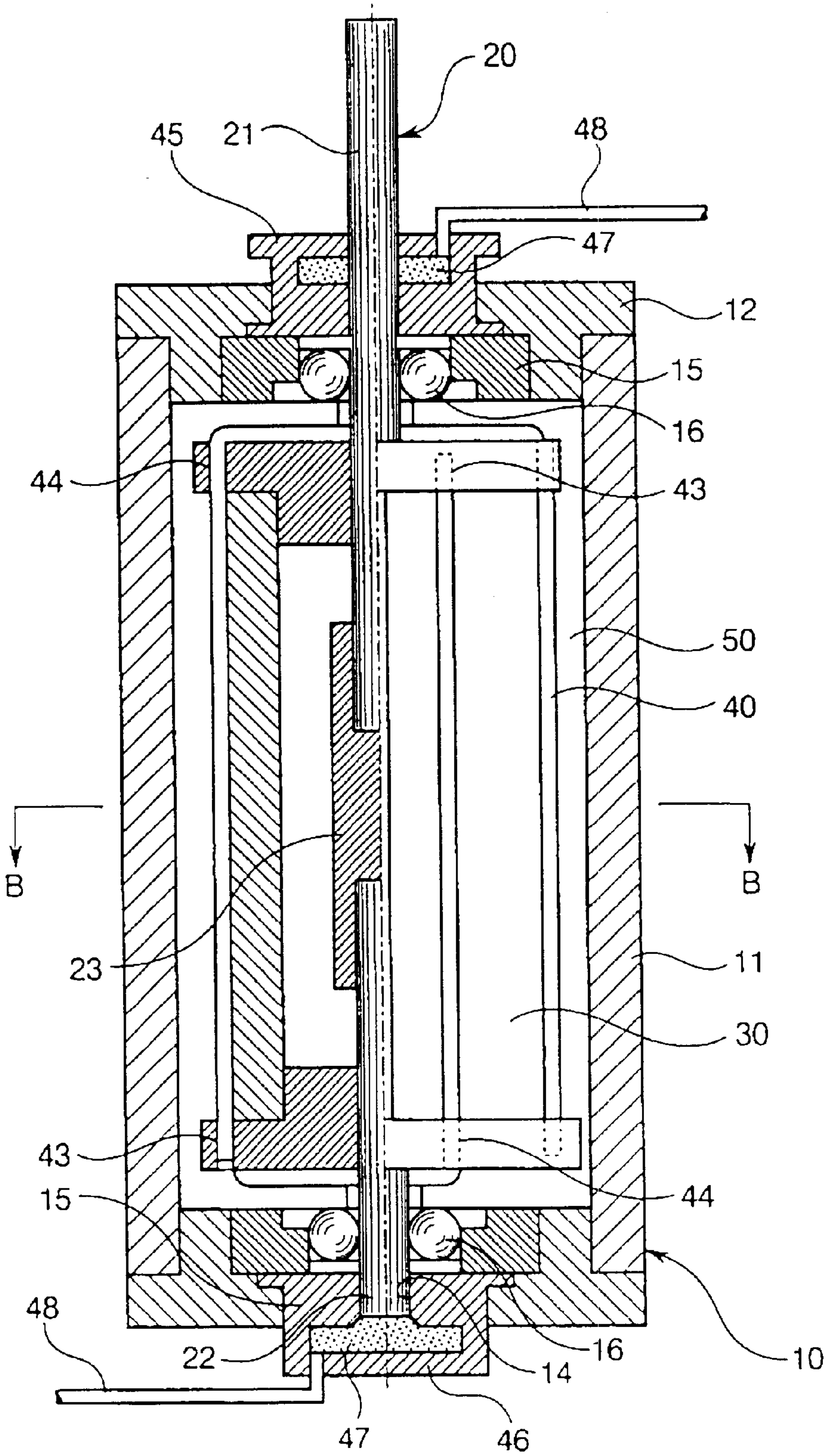
FIG. 3 shows the example of the RE type ECF motor that used the electro-sensitive movable medium of this invention.

FIGS. 3 and also 4 is the sectional plan that shows the example of the structure of RE type ECF motor like the trace.

Figure 4:
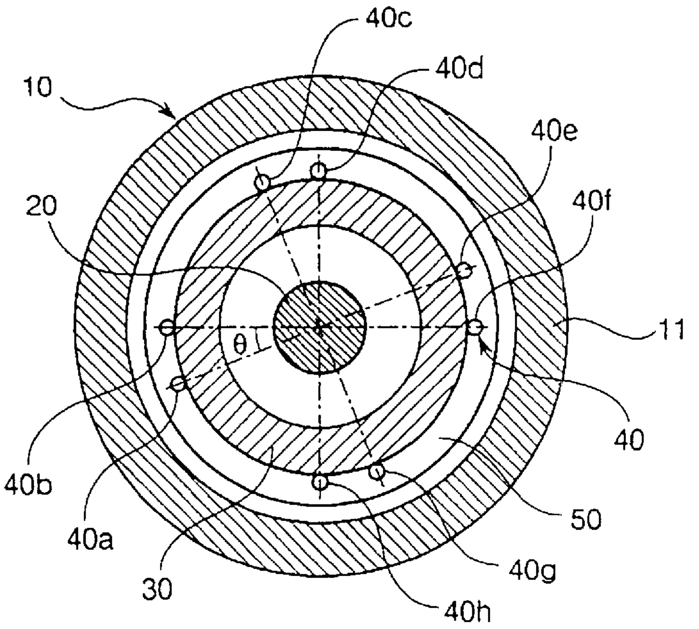
FIG. 4 is the side sectional plan of the RE type ECF motor that used the electro-sensitive movable medium of this invention.

RE type ECF motor is having package 10 that consists of with cover body 12 that makes the connection in the upper part release department of bottom exist form medium accommodation department 11, this medium accommodation department 11 that accommodate the electro-sensitive movable medium 50 and tightly seal medium. accommodation department 11, as shown in FIG. 3 and also FIG. 4. This cover body 12 forms package 10 that was tightly sealed with cover body 12 and medium accommodation department 11, by doing the connection to the opening of the upper part of medium accommodation department 11.

Concavo shape ball bearing parts 14 is established in the center of the bottom of medium accommodation parts 11. The lower end parts of axis 20 is supported by this ball bearing parts 14. Turn style point of contact 46 that connects outside terminal 48 and electrode 40*a*, 40*c*, 40*e*, 40*g* in, this concavo shape ball bearing parts 14 electrically is formed. Turn style point of contact 46 is contacting with lower part axis 22. Mercury 47 is being enclosed to the turn style point of contact 46 middle and this mercury 47 is contacting with lower part axis 22. Also, it is done as bearing system 16 is being formed in, concavo shape ball bearing parts 14 suitably and be able to reduce the friction coefficient between concavo shape ball bearing parts 14 and lower part axis 22.

The upper part of above medium accommodation parts 11 is released to fill up the electro-sensitive movable medium 50.

Package 10 that was tightly sealed is formed by being fit in the upper part of medium accommodation parts 11 where it was released, after upper part cover body 12 filled up the electro-sensitive movable medium 50 into above medium accommodation parts 11.

And this upper part cover body 12 is having upper part ball bearing parts 15 that upper part axis 21 penetrates to the central part. Turn style point of contact 45 that supplies electricity to this upper part ball bearing parts 15 to electrode 40*b*, 40*d*, 40*f*, 40*h* through upper part axis 22 is kept. Bearing system 16 is incorporated suitably to reduce the friction coefficient with upper part ball bearing axis hole 15 in, upper part axis 21. The leading wire is deduced from this turn style point of contact 45 and form outside terminal 48. Mercury 47 is filled up, in these turn style point of contact 45 as the electric conductor.

Furthermore, in FIG. 3 above upper part cover body 12 can also raise sealing more by may be done and also causing to exist packing etc. between medium accommodation parts 11 and upper part cover body 12 as it makes medium accommodation parts 11 upper part cover body 12 and grain connection, to make the sealing of higher of package 10, although it is formed as it does the connection in medium accommodation parts 11.

Axis 20 is being divided with the upper part and lower part by pipe state rotor 30 that was established into medium accommodation parts 11 and upper part axis 21 and lower part axis 22 are insulated electrically with insulation parts material 23. Upper part axis 21 penetrates upper part ball bearing parts 15 that was established in above upper part cover body 12 and be done axis to the time movement free and the lower end parts of the other, lower part axis 22 are supported to the time movement free by concavo shape ball bearing parts 14 that is established in the center of the bottom of the above medium accommodation parts 11. Pipe state rotor 30 that turns with axis 20 inside medium accommodation parts 11 between this upper part axis 21 and lower part axis 22, is arranged. This pipe state rotor 30 is arranged and is formed the gap so as not to be having the cylinder form structure as the central axis of the turn and contact axis 20 with the inside circumference wall of medium accommodation parts 11. The ratio (inside diameter of medium accommodation parts 11 is divided by the diameter of the rotor 30) between the diameter of the inside diameter and this pipe state rotor 30 of medium accommodation parts 11 are desirable that the ordinariness is 1.01 or more, especially be in 1.05~10.0 ranges.

Furthermore, one and, section that pipe state rotor 30 has many protrusion parts in rectangular Parallelepiped State and, surface by the use purpose, not limited to the cylinder form can use various things like the star state. Also as for pipe state rotor 30 the hollow parts vacuous, I can fill up air, gas, liquid or solid etc. and able to adjust various the weight in the case that be made in a hollow state and made a hollow state. By adjusting the weight of pipe state rotor 30 being able to adjust specific gravity of pipe state rotor 30 in the electro-sensitive movable medium 50 middle the exercise or balance of pipe state rotor 30 can be adjusted. Also, it can make flat RE type ECF motor, by make this pipe state rotor 30 the flat disk state and adjusting the electrode to the surface and also under face of this disk.

Electrode 40*b*, 40*d*, 40*f*, 40*h* that connected with electrode 40*a*, 40*c*, 40*e*, 40*g* and also lower part axis 22 that connected with upper part axis 21 on the surface of the above kind of cylinder form pipe state rotor 30 are laid. Electrode 40*a*, 40*c*, 40*e*, 40*g* and also electrode 40*a*, 40*c*, 40*e*, 40*g* can form the leading wire by doing expandable setting in the cylinder surface of pipe state rotor 30. Electrode 40*a*, 40*c*, 40*e*, 40*g* and electrode 40*a*, 40*c*, 40*e*, 40*g* between arrangement positions can set up proper it. As for FIG. 3 the example of the arrangement of the electrode that pipe state rotor 30 saw the RE type ECF motor that was arranged from top direction has been shown. The ordinariness is done and is set up angle θ between the electrode, that electrode 40*a*, 40*c*, 40*e*, 40*g* and electrode 40*b*, 40*d*, 40*f*, 40*h* is set 3.0~90.0 degree, desirably 1.0~180 degree. As for angle θ between this electrode, electrode 40*a*~40*h* can do this 2~120 expandable setting, to make angle θ between the above electrode the above kind of value, because it fluctuates even if it depends on the number of the electrode that does expandable setting.

Furthermore, in FIGS. 3 and also 4, the electrode is expanded in the pipe state rotor 30 surface from electrode fixation hole 44 and the top parts is inserted in electrode fixation hole 43 and be done expandable setting in the pipe state rotor 30 surface. This electrode can also form by utilizing plating technology and print foundation technology.

The homogeneous electro-sensitive movable medium 50 is filled up inside, package 10 that has the above kind of constitution.

The example of the RE type ECF motor equipped with pipe state rotor 30 that was formed with the tubelike shape parts material within package 10, in FIGS. 3 and also 4, is shown. This pipe state rotor 30 in, for example axis 20 that was formed with metal circle stick etc. is kept.

As it is possible DC voltage add between electrode 40*a*, 40*c*, 40*e*, 40*g* and electrode 40*b*, 40*d*, 40*f*, 40*h* of the above kind of RE style ECF motor the plus terminal and minus terminal of the DC power supply are connected with each outside terminal 48, 48. In this case, you may make which a positive electrode, although make either of electrode 40*a*, 40*c*, 40*e*, 40*g* and also electrode 40*b*, 40*d*, 40*f*, 40*h* a positive electrode and make the other a negative electrode. By doing DC voltage add the moving flow of the homogeneous electro-sensitive movable medium 50 is formed and pipe state rotor 30 starts the turn by this moving flow reaction.

Furthermore, the device that uses the homogeneous electro-sensitive movable medium of the difficultly flammable or nonflammable of this invention may be the combined type of the above SE type ECF motor and RE type motor. For reasons, there is at least 1 pair of electrodes installed on inside wall of the package and at least 1 pair of electrodes installed on the rotor, and the rotor can rotates itself derived from the moving flow formed on the electrodes on the rotor while the rotor receives the moving flow of the homogeneous electro-sensitive movable medium derived from electrodes installed on the inside wall of the package.

Furthermore, the details of this combined type ECF motor are disclosed to the registration official bulletin of new design for practical use registration No. 3041928 in detail.

Also, by utilizing the moving flow that be formed, for example the machine part or electron part etc. can be washed precise by doing voltage to the homogeneous electro-sensitive movable medium of the difficultly flammable or nonflammable of this invention add.

The example of the washing device that can use this method in FIG. 7 is shown like the trace.

So that shown in FIG. 7 washing object 82 can be washed by contacting washing object 82 and this moving flow 81 that arrange electrode 71 and also electrode 72 to the homogeneous electro-sensitive movable medium 50 middle of the difficultly flammable or nonflammable of this invention and form moving flow 81 of the homogeneous electro-sensitive movable medium 50 among this electrode 71,72 and did setting on one of electrode 71. It is preferable to use the cirrus electrode that did fiber 73 cirrus set on the surface of electrode 72, to form moving flow 81 of the homogeneous electro-sensitive movable medium 50 that advances selectively toward electrode 71 that washing object 82 is done setting from electrode 72 like this. Namely, this washing device is having 1 pair of electrode 71,72 at least. It is preferable to use the cirrus hair electrode that did fiber 73 in the surface cirrus set, as electrode 72 that forms this 1 pair of electrode can form a un-uniform electric field in the homogeneous electro-sensitive movable medium 50. And, it is desirable to use the electric conduction fiber for the part at least house, of fiber 73 where forms this cirrus electrode in this invention. Here, as for the electric conduction fiber the ratio resistance value, is the fiber of the $10^2$ω·cm following. By doing the electric conduction fiber that has such a ratio resistance value cirrus set on the surface of electrode 72 the potential difference between electrode 71 of the top parts and the other of electric conduction fiber 73 that it was done this cirrus set become very big and the moving flow (the jet style) is formed toward electrode 71 from the top of the fiber of electrode 72 by, voltage add. Moreover, the un-uniform electric field is formed to the homogeneous electro-sensitive movable medium that is filled up into container 60, by using the cirrus electrode like this and the very strong jet style is formed by this un-uniform electric field. Furthermore, the fluorinated organic compound that is used as a homogeneous electro-sensitive movable medium with this invention can wash and can melt the dirt that adhered to washing object 82 firmly, because it is also a fine washing solvent or can remove and can come off dirt physically with the jet style speed of a running fluid. This jet style strength can adjust proper it by changing add voltage with controller 90.

Furthermore, jet moving flow 81 that was formed toward electrode 71 from the edge parts of the cirrus set fiber the moving flow that changes the direction toward cirrus electrode 72 and turned on the surface of the cirrus electrode becomes jet style from the edge parts of the fiber once again, after it reached washing object 82 that was done in the surface or surface of electrode 71 setting and be sent.

It originates from such a bubble, by using the halogen organic compound, especially fluorinated organic compound that the bubble sometimes is adhering on the surface of washing object 82 and prescribe with this invention as the electro-sensitive movable medium, in the case that make the homogeneous electro-sensitive movable medium of this invention washing liquid like this and use and the electro-sensitive movable medium does not burn, granted that the spark occurred and also even the deterioration of the electro-sensitive movable medium by the spark is few.

Next, the pump system using the homogeneous electro-sensitive movable medium of this invention is explained.

The pump that used the electro-sensitive movable medium of this invention is the device that moves the homogeneous electro-sensitive movable medium to the place of many from the place which forms the moving flow of the medium and exist, by doing voltage to the homogeneous electro-sensitive movable medium add.

By arrange 1 pair of electrode to an above homogeneous electro-sensitive movable medium at least namely, and doing voltage to this electrode add forming the moving flow of an above homogeneous electro-sensitive movable medium the medium is move.

The example of the pump that used the electro-sensitive movable medium of this invention in FIG. 8 is shown concretely.

As shown in FIG. 8, 1 pair of electrode **40*a*, 40*b* be being arranged to the homogeneous electro-sensitive movable medium 50 middle of the above at least the pump that used the electro-sensitive movable medium of this invention and be done 1 pair of electrode as be possible the voltage of 200V~15KV in the homogeneous electro-sensitive movable medium 50 add desirably 100V~20KV, with controller 90** at least this.

Having the 1st container 91 and the 2nd container 92 in, FIG. 8 this 1st container 91 and the 2nd container 92 are touched the league with the 1st channel 93 and the 2nd channel 94. Above homogeneous electro-sensitive movable medium 50 is filled up into this pump. The moving flow of the electro-sensitive movable medium is formed toward electrode **40*b* of the other from one of electrode 40*a*, when do DC voltage to 1 pair of electrode 40*a*, 40*b* add here, and a un-uniform electric field is formed in the homogeneous electro-sensitive movable medium 50 and the electro-sensitive movable medium 50 in container 91 transfers to container 92. If container 91 and container 92 are located horizontally the electro-sensitive movable medium of the quantity corresponding to the quantity that the liquid level inside container 92 rises by the moving flow of such a electro-sensitive movable medium 50 and inevitably flowed into container 92 flows into container 91 through channel 94. It works as the pump that electrode 40*a*, 40*b* move the electro-sensitive movable medium 50 that the moving flow of the above kind of the electro-sensitive movable medium 50 is formed continuously and be filled up to container 91 and also 92 to the container of the other from one of container, if it continues to do voltage to electrode 40*a*, 40*b*** add namely.

And, for example it adjoins in container 92 and arrange the generation parts material (no figure) and the electro-sensitive movable medium is warmed in container 92, by arranging container 91 to the low part of temperature even more the generation parts material (namely, heat absorption), this electro-sensitive movable medium 50 that was warmed by the heat from the generation parts material the heat in the electro-sensitive movable medium 50 radiates heat, through the means that it transfers it in container 91. Accordingly, (no figure) can be cooled by the electro-sensitive movable medium 50 the generation parts material that is in the container 92 vicinity, by the pump that used this electro-sensitive movable medium.

There is not that of the ignition by spark even if the electro-sensitive movable medium of this invention is in the case that the air and the electro-sensitive movable medium always contact like this, although the example of the opening system that the electro-sensitive movable medium contacts in, FIG. 8 with air is shown. Furthermore, it is of course to can carry out with the sealing system as the electro-sensitive movable medium does not contact with air fundamentally in the use method of the electro-sensitive movable medium of this invention. Also, the electro-sensitive movable medium does voltage to 1 pair of electrode add at least according to, the method of this invention and because it flows, for example container 91 and also container 92 as shown in FIG. 8 need not to be in the same level by forming the moving flow of the electro-sensitive movable medium and may there is a difference in the height difference or level in container 91 and also container 92.

Also, FIG. 8 in, as for the electrode, the forms of these electrodes are sufficient to obtain and are sufficient to form a un-uniform electric field to combination etc., the electro-sensitive movable medium between the needle state electrode and pipe state electrode, although 1 pair of bar electrode is used.

Next, the different example of RE type ECF motor is shown. FIG. 9(A) watches the obliqueness that shows it and be the condition of the electrode where sectional plan and also, FIG. 9(B) of the RE type ECF motor were laid to the turn body a figure. Also, the structure other the electrode that is laid to the turn body in, FIG. 10 is shown. It has done the order the numbers same to the parts material that is common with above SE type ECF motor, in the explanation of this RE type ECF motor.

As for the RE type ECF motor of this invention, the fundamental constitution parts material is similar as above SE type ECF motor. Yet, as for this RE type ECF motor the construction position of the electrode, the electrode is laid on the difference, turn body from SE type ECF motor and this turn body forms the moving flow of the electro-sensitive movable medium by doing voltage add and do automatic driven by the reaction.

The aspect that positive pole electrode **150*a* and also negative pole electrode 150*b*, were done in a/the radiation state expandable setting sincerely the middle of the turn body in FIG. 9(B), is shown. However, the arrangement, form of the electrode are sufficient to can form a un-uniform electric field during the electro-sensitive movable medium, because the moving flow of the electro-sensitive movable medium is formed, by arranging the electrode as a un-uniform electric field is formed during the electro-sensitive movable medium in this RE type ECF motor. For instance, I can also arrange this positive pole electrode 150*a* and also negative pole electrode 150*b* as 1 pair of positive pole electrode 150*a* and negative pole electrode 150*b* become and omit parallel so that shown in FIG. 10. In this case, when the electrode that produces the moving flow toward negative pole electrode 150*b* from positive pole electrode 150*a* in the electrode, FIG. 10 of the other from one of electrode as the electro-sensitive movable medium, is used the electro-sensitive movable medium inside the RE style ECF motor of this invention the surface or the back of turn body 130 along the moving flow of the circumference circular produce toward the moving flow reaction that turn body 130** occurs turn and drive.

For example the use method of the electro-sensitive movable medium of this invention has 3 halogen atoms, especially fluorine atom, to the SE type ECF motor, RE type ECF motor, combined type ECF motor, washing devices, pump etc. that mentioned above into the molecule at least it is the homogeneous electro-sensitive movable medium including one kind of liquid state organic compound at least. A homogeneous electro-sensitive movable medium about the electro conductivity at the operation temperature are in the range of $4\times10^{-10}$~$5\times10^{-6}$ S/m and fill up the difficultly flammable or nonflammable nature the electro-sensitive movable medium that the surface tension of the homogeneous electro-sensitive movable medium at the operation temperature is 22 dyn/cm following and do not have the flash point substantially suitably. Arranging 1 pair of electrode at least during this electro-sensitive movable medium it does the voltage of 200V~15KV add desirably 100V~20KV, among this electrode. The voltage that does add here is possible to do the voltage of the various structures such as the rectangle wave, pulse wave add, although the ordinariness is DC voltage. The un-uniform electric field is formed during the electro-sensitive movable medium, by doing voltage to the electro-sensitive movable medium add like this. By doing voltage add in this way the homogeneous electro-sensitive movable medium of this during invention as for the current that flows, the ordinariness is 0.05~10.0 $\mu$A, suitably 0.001~100 $\mu$A. Accordingly, $1\times10^{-10}$~1.0 W, suitably the electric power that is supplied to the electro-sensitive movable medium of this invention is $5\times10^{-7}$~$7\times10^{-2}$ W.

And, the moving flow of the electro-sensitive movable medium is formed by the un-uniform electric field that was formed during the electro-sensitive movable medium. I take out this moving flow as the rotary power and can use as motor and also can use the moving flow as the washing liquid style, by contacting this moving flow with the washing object.

As for the electro-sensitive movable medium of this invention the liquid form organic compound that has 3 fluorine atoms at least in 1 molecule, granted that be including 1 kind at least and will measure the flash point in accordance with the measurement method of the general flash point about this electro-sensitive movable medium the evident flash point does not exist. Accordingly, the electro-sensitive movable medium of this invention is difficultly flammable or nonflammable and be in many cases nonflammable.

Spark sometimes happens among an electrode when it does high voltage add, for example, when air exists to form a un-uniform electric field to an electro-sensitive movable medium. It sometimes ignites an electro-sensitive movable medium when spark occurs repeatedly, when an electro-sensitive movable medium is combustibility. Although the reliability of the time that repeats an electro-sensitive movable medium and use is not sufficient the electro-sensitive movable medium including the fluorinated organic compound of this invention there is not the risk of ignition and also even the oxidization deterioration difficult to do.

Moreover, range inside, of $4\times10^{-10}$~$5\times10^{-6}$ S/m preferable the electric conduction rate under the operation environment of the homogeneous electro-sensitive movable medium including the halogenated organic compound, especially fluorinated organic compound that prescribe with this invention are in the range of $5\times10^{-10}$~$2.5\times10^{-6}$ S/m. By doing voltage add, besides the moving flow of an electro-sensitive movable medium is formed as for this electro-sensitive movable medium, the surface tension be low. By doing voltage add the high moving flow of the speed of a running fluid can be formed easily. Also, the surface tension is derived from the halogenated organic compound, especially the fluorinated organic compound and the electro-sensitive movable medium of this invention including this fluorinated organic compound low. The moving flow style of the electro-sensitive movable medium can be formed more efficiently, because the surface tension of the electro-sensitive movable medium that resists moving flow formation is small, in the case that this electro-sensitive movable medium is used with (for example: RE type ECF motor which has thickness about 2 mm and the SE type ECF motor which has the diameter about 3 mm etc) an ultra small device especially.

EFFECT OF THE INVENTION

The electro-sensitive movable medium of this invention is the electro-sensitive movable medium that contains the liquid organic compound that has at least 3 halogen atoms, especially fluorine atoms, in the molecule and this electro-sensitive movable medium is difficultly flammable or non-flammable. Accordingly, this electro-sensitive movable medium does not burn, granted that spark resulted tentatively by doing voltage add and even the dissolution reaction of part oxidization etc. difficult to result. Furthermore, the electro-sensitive movable medium of this invention is the even liquid that has a specified electro conductivity and can use for stability in long time. Furthermore, besides the electro conductivity at the operation temperature is in the range of $4\times10^{-10}$~$5\times10^{-6}$ S/m following and as for the electro-sensitive movable medium of this invention, the surface tension, is very low as 22 dyn/cm or smaller, can form the moving flow of the electro-sensitive movable medium finely through the means that it does voltage add.

Also, the halogenated organic compound, especially fluorinated organic compound that form the electro-sensitive movable medium of this invention are having fine washing and can wash the washing object effectively, by contacting the moving flow of this electro-sensitive movable medium with the washing object.

EXAMPLE

Next this invention is not limited to this although show the example of this invention and explain this invention.

Example 1~11

The electro conductivities (the electricity resistance value) of compounds and mixtures (an electro-sensitive movable medium) mentioned in Table 1 were measured at 25° C. The electro conductivity is the electricity resistance value in the time that puts the compound among 2 sheets of metal disk electric pole plates of the diameter of 3.5 cm and did DC voltage 2KV add. Also, surface tension was measured in accordance with the method that is prescribed in JIS-3362 about these compounds and also compounds (the electro-sensitive movable medium). Also, these compounds and the mixtures are whichever nonflammable, without being having the flash point even either compound and the mixture, although the flash point is measured by using the measurement device (for example Cleveland opening ceremony) of the flash point that is used generally about these compounds and the mixture.

Figure 5:
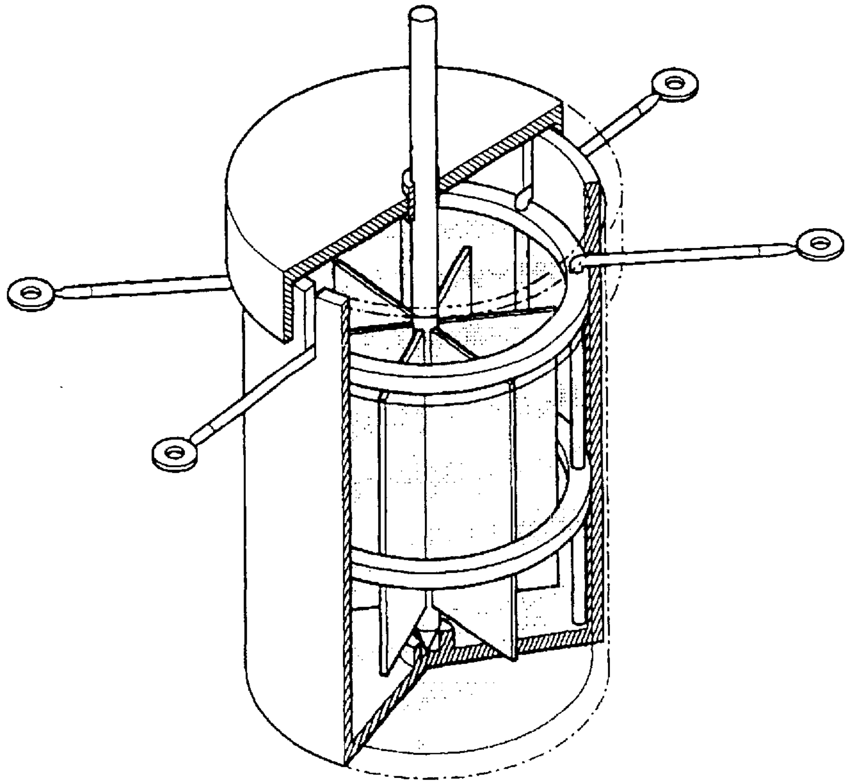
FIG. 5 shows the example of the washing device that used the electro-sensitive movable medium of this invention.

When fill up into the SE type ECF motor that shows the above electro-sensitive movable medium to FIGS. 5 and also 6 and did the DC voltage of 6KV add in 25° C. the turn number of the fin rotor was measured.

The SE type ECF motor that used it here the height of the fin board the inside circumference of the bottom exists cylinder form container is 20 mm and the number of sheets of the wing board of the fin rotor is 8 sheets and is 35 mm and the fin board buries completely when the width is 17 mm and fill up 12 ml of medium into this container.

Also, 4 electrodes are being kept to this SE type ECF motor and make the 1st and the 3rd electrode a negative electrode and made the 2nd and the 4th electrode a positive electrode. This 1st and 3rd electrode of angle, that the angle and also the 2nd and the 4th electrode of which do becomes 180 degree individually and angle, that does it arranged the electrode so that it becomes 45 degree individually the angle and also the 3rd and the 4th electrode of which 1st and 2nd electrode does.

I insert 12 ml of medium to the SE type ECF motor that has such constitution and do the DC voltage of 6KV add among the electrode and measured the turn number of the rotor. The result is shown in Table 2. Furthermore, the current value in this time was 5 $\mu$A individually.

Also, the diameter of the bottom exists pipe state container is 3 mm, although it has the structure similar to the above about the occurrence of the bubble, and the fin board number of sheets of the fin rotor is 6 sheets 5 mm, and the height fills up the medium into, the SE type ECF motor of the width of 2.5 mm 3 mm, the 0.03 ml of height and make like the above and drove. I observed bubble occurrence situation, by using the digital microscope of the magnification of 175 times during the medium within the SE type ECF motor at the time of this turn drive. The result is shown in Table 2.

Furthermore, bubble occurrence means that was hardly admitted, that it is "little" the occurrence of the bubble and "middle" mean that the occurrence of the bubble is able to recognize although the medium does not make white and "many" means the condition where the medium is equivocating white by bubble occurrence.

TABLE 1

| | Electro-sensitive movable medium | Electric conduction rate (S/m) | Surface tension (Dyn/cm) |
|---|---|---|---|
| Example 1 | Ethyl-perfluoro-ether | $1.0 \times 10^{-9}$ | 14 |
| Example 2 | Ethyl-perfluoroisobutyl-ether | $1.0 \times 10^{-9}$ | 14 |
| Example 3 | Methyl-perfluorobutyl-ether | $1.1 \times 10^{-9}$ | 14 |
| Example 4 | Methyl-perfluoroisobutyl-ether | $1.1 \times 10^{-9}$ | 14 |
| Example 5 | $C_9F_{18}$ (Trimer of $CF_3$—CF═$CF_2$)*[1] | $3.5 \times 10^{-9}$ | 16 |
| Example 6 | $C_6F_{12}$ (Dimer of $CF_3$—CF═$CF_2$)*[2] | $6.6 \times 10^{-10}$ | 13 |
| Example 7 | Benzotrifluoride | $5.0 \times 10^{-8}$ | 21 |
| Example 8 | p-Chlorobenzotrifluoride | $2.0 \times 10^{-8}$ | 19 |
| Example 9 | Perfluorinated thermomedium*[3] | $5.2 \times 10^{-10}$ | 12 |
| Example 10 | Mixture of Ethyl-perfluorobutyl-ether 50 wt % and Fluorinated inert liquid*[4] 50 wt % | $7.8 \times 10^{-10}$ | 14 |
| Example 11 | Fluorinated inert liquid (80° C.) | $4.2 \times 10^{-10}$ | 10.5 |

Note:)
*[1]Organization of $C_9F_{18}$ (3 quantity bodies of $CF_3$—CF═$CF_2$)
$(CF_3)_2$CFCF═C($CF_3$)CF$(CF_3)_2$-52% weight
$(CF_3)_2$CF$CF_2$—C($CF_3$)═C$(CF_3)_2$-48% weight
*[2]Organization of $C_6F_{12}$ (2 quantity bodies of $CF_3$—CF═$CF_2$)
$(CF_3)_2$CFCF═CF$CF_3$-93% weight
$(CF_3)_2$C═CF$CF_2CF_3$-7% weight
*[3]Perfluorinated thermomedium
Product name: GALDEN HT-200, Ausimont K.K. production

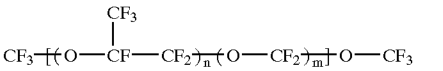

*[4]Product name: Fluorinert FC-43, Sumitomo 3M Co. Inc. production (Complete fluorinated compound (carbon number of a main component is 12) CAS. No. 86508-42-1, content 100%)

TABLE 2

| | Rotational Speed | Bubble occurrence |
|---|---|---|
| Example 1 | 108 rpm | Little |
| Example 2 | 102 rpm | Little |
| Example 3 | 105 rpm | Little |
| Example 4 | 102 rpm | Little |
| Example 5 | 52 rpm | Little |
| Example 6 | 40 rpm | Little |
| Example 7 | 68 rpm | Little~middle |
| Example 8 | 70 rpm | Little~middle |
| Example 9 | 35 rpm | Little |
| Example 10 | 81 rpm | Little |
| Example 11 | 18 rpm | Little (80° C.) |

Furthermore, it did voltage add, after repeat and fill up the above electro-sensitive movable medium as a result of the experiment, spark sometimes occurs between the electrode instantaneously, did not ignite the electro-sensitive movable medium.

Reference Example 1

The exception that used dibutyladipate as the electro-sensitive movable medium in example 1 did similarly and drove it SE type ECF motor.

Dibutyladipate is the structure of $C_4H_9$—OCO—$(CH_2)_4$—COO—$C_4H_9$, the electro conductivity was 1.0× 10−8 S/m, the surface tension was 33 dyn/cm and the flash point was 160° C. on the Cleveland open-method, along same measurement method as example 1. As fill up into the small size SE type ECF motor for the bubble occurrence confirmation that used this dibutyladipate, with example 1 and the occurrence condition of the bubble is confirmed the occurrence situation of the bubble "many" be, many bubbles occur and dibutyladipate was equivocating white.

The SE type ECF motor that used dibutyladipate as the electro-sensitive movable medium repeated on and off of the voltage, although it drove it with the turn number of 69 rpm, by doing the DC voltage of 6KV add and ignited dibutyladipate by the spark between the electrode, while doing the drive experiment of motor and had to stop the experiment in this point. Also, the generate of the spark is observed frequently during, the measurement of bubble generate condition repeatedly on and off of voltage in, the small size SE type ECF motor for bubble occurrence confirmation and judge as danger, because the white smoke generated from motor with the nasty smell at the end and had to stop the experiment in this point.

Reference Example 2

The exception that makes 25° C. did similarly the temperature of the perfluorinated inert liquid that used it in example 11, and tried to drive SE type ECF motor.

The electro conductivity in 25° C. of this perfluorinated inert liquid is $7.0\times10^{-13}$ S/m and the surface tension at 25° C. is 12 dyn/cm.

However, the SE type ECF motor that filled up the perfluorinated inert liquid of 25° C. did not turn, because the electro conductivity in 25° C. of this perfluorinated inert liquid is too low.

What is claimed is:

1. A power device comprising at least one pair of electrodes and a medium comprising at least one liquid organic compound having at least 3 halogen atoms in the molecule thereof, the medium having an electro conductivity in the range of $4\times10^{-10}$~$5\times10^{-6}$ S/m at the operation temperature of the medium and a surface tension of 22 dyn/cm or smaller at the operation temperature of the medium.

2. The device as claimed in claim 1, in which the halogen atom is fluorine.

3. The device as claimed in claim 1 or 2 in which said medium is difficultly flammable or non-flammable, substantially not having a flash point.

4. A method of using an electro-sensitive movable medium, comprising arranging at least one pair of electrodes in the medium as defined in any of the claims 1 or 2 and applying a electric voltage of 100V~20KV between the pair of electrodes to make the medium move from one electrode direction toward the other electrode direction.

5. The method as claimed in claim 4, which comprises arranging the medium and at least one pair of electrodes in a package, applying the electric voltage of 100V~200KV between the pair of electrodes to form the moving flow of the medium and rotate a rotor, equipped rotatably in the package, by the formed flow.

6. The method as claimed in claim 4, which comprises filling a package with the medium, laying at least one pair of electrodes on a rotor equipped rotatably in-the package, applying the electric voltage of 100V~20KV between the pair of electrodes to form the moving flow of the medium and rotate the rotor by a reaction of the moving flow.

7. The method as claimed in claim 4, which comprises filling, with the medium, a container equipped with at least one pair of electrodes, placing a washing object and applying the electric voltage of 100V~20KV between the pair of electrodes to form the moving flow of the electro-sensitive movable medium and bringing the washing object into contact with the moving flow of the electro-sensitive movable medium to wash the washing object.

8. The method as claimed in claim 4, which comprises filling, with the medium, a container having at least one pair of electrodes and applying the electric voltage of 100V~20KV between the pair of electrodes to form the moving flow of the electro-sensitive movable medium and move the electro-sensitive movable medium to a target position.

9. The method as claimed in claim 8, which comprises transporting heat energy of a high temperature-having part to a low temperature-having part or that of a low temperature-having part to a high temperature-having part.

10. The method as claimed in claim 9, which comprises filling a closed circulation system with the medium and applying the electric voltage to the medium to form the moving flow thereof and circulate the medium in the closed circulation system and transport heat energy.

11. Use of the medium as defined in claim 1 as a driving liquid.

12. The use as claimed in claim 11 to drive an actuator, a pump, or a motor.

* * * * *